US011222150B2

(12) United States Patent
Miyazaki et al.

(10) Patent No.: US 11,222,150 B2
(45) Date of Patent: Jan. 11, 2022

(54) SIMULATION PROGRAM

(71) Applicant: Hitachi Automotive Systems, Ltd., Hitachinaka (JP)

(72) Inventors: Taizou Miyazaki, Tokyo (JP); Masaru Yamasaki, Tokyo (JP); Takafumi Hara, Tokyo (JP); Katsuhiro Hoshino, Hitachinaka (JP); Kazuto Oyama, Hitachinaka (JP); Takeshi Yoshida, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 694 days.

(21) Appl. No.: 16/083,034

(22) PCT Filed: Jan. 19, 2017

(86) PCT No.: PCT/JP2017/001625
§ 371 (c)(1),
(2) Date: Sep. 7, 2018

(87) PCT Pub. No.: WO2017/154362
PCT Pub. Date: Sep. 14, 2017

(65) Prior Publication Data
US 2019/0102491 A1    Apr. 4, 2019

(30) Foreign Application Priority Data

Mar. 11, 2016    (JP) .............................. JP2016-047744

(51) Int. Cl.
*G06G 7/48*        (2006.01)
*G06F 30/20*       (2020.01)
(Continued)

(52) U.S. Cl.
CPC ........... *G06F 30/20* (2020.01); *G01M 17/007* (2013.01); *G06F 30/00* (2020.01); *G06F 30/15* (2020.01); *G06F 30/17* (2020.01)

(58) Field of Classification Search
CPC .......... G06F 30/15; G06F 17/50; G06F 17/10; G06F 30/20; B60W 2710/08; B60W 10/00; G06G 7/00; G06G 7/14
See application file for complete search history.

(56) References Cited

U.S. PATENT DOCUMENTS 6,304,835 B1* 10/2001 Hiramatsu ............... G06G 7/64
703/7
2003/0115037 A1* 6/2003 Sumida ................ G06F 30/367
703/22
2015/0347670 A1* 12/2015 James ..................... F16H 57/00
703/2

FOREIGN PATENT DOCUMENTS

JP        11-282897 A      10/1999
JP        2002-175338 A    6/2002
(Continued)

OTHER PUBLICATIONS

John Wellford Automotive electric Actuator Modeling and Design Methodologies University of Manchester, School of Electrical and Electronic Engineering (Year: 2014).*
(Continued)

*Primary Examiner* — Rehana Perveen
*Assistant Examiner* — Cuong V Luu
(74) *Attorney, Agent, or Firm* — Crowell & Moring LLP (57) ABSTRACT

The invention is directed to modeling of heat and vibration for structures. Therefore, with a traditional model division for each component, one-to-one correspondence between the models and the components is not necessarily realized. There has been a problem in that it is difficult to divide the models. To solve the above problem, a simulation program according to the present invention includes a first model for calculating a first vehicle characteristics parameter, a second model for calculating a second vehicle characteristics parameter to transfer energy without converting the energy, (Continued)

and an interface model for performing conversion calculation of the first vehicle characteristics parameter and the second vehicle characteristics parameter.

6 Claims, 6 Drawing Sheets

(51) Int. Cl.
    *G01M 17/007*     (2006.01)
    *G06F 30/00*     (2020.01)
    *G06F 30/15*     (2020.01)
    *G06F 30/17*     (2020.01)

(56) References Cited

FOREIGN PATENT DOCUMENTS

| | | |
|---|---|---|
| JP | 2007-34381 A | 2/2007 |
| JP | 2008-152623 A | 7/2008 |
| JP | 2011-242259 A | 12/2011 |
| JP | 2012-53556 A | 3/2012 |
| WO | WO 2008/034499 A1 | 3/2008 |

OTHER PUBLICATIONS

Xin Ge Simulation of Vibrations in Electrical Machines for Hybrid-Electric Vehicles Chalmers University of Technology (Year: 2014).*
Sanada, "Principle and Design Method of Energy-Saving Motor", Kagakujyoho shuppan Co., Ltd. 2013 (one (1) page).
Kanematsu et al., "Radial Force Control of IPMSM Considering Magnetic Flux Distribution on No-Load Condition", The Papers of Technical Meeting on Vehicle Technology VT-12, Institute of Electrical Engineers of Japan, 2012, p. 1-6 with English abstract (six (6) pages).
Fukue et al,. "Simple Thermal Design Method of Fan Cooled Electronic Equipment with High Accuracy", JSME TED, Newsletter No. 72, 2014 p. 10-18, with partial translation (eleven (11 pages).
International Search Report (PCT/ISA/210) issued in PCT Application No. PCT/JP2017/001625 dated May 9, 2017 with partial translation (four (4) pages).
Japanese-language Written Opinion (PCT/ISA/237) issued in PCT Application No. PCT/JP2017/001625 dated May 9, 2017 (three (3) pages).

* cited by examiner

SIMULATION PROGRAM

TECHNICAL FIELD

The present invention relates to a simulation program, and more particularly, to a program of a vehicle integration simulator.

BACKGROUND ART

A vehicle system is a complex system consisting of combinations of a large number of components. In recent years, functions required for vehicles have been increasingly sophisticated and complicated such as reduction in fuel consumption and enhancement in safety performance. Moreover, since market demand changes year by year, it is required to shorten a development period and respond to customer needs as soon as possible.

As a method to solve the above problem, a vehicle integration simulator has been used. An object of using the vehicle integration simulator is to mathematize and program a behavior of an entire vehicle in advance so as to simulate the behavior by using a computer and the like and to estimate a performance of the vehicle by calculation without an actual vehicle. Hereinafter, mathematical expressions and programs are referred to as "models", and an operation for making a state to be simulated by using the model is referred to as "modeling".

The performance of the vehicle has been evaluated by prototyping a vehicle. However, by using the vehicle integration simulator, the performance of the vehicle can be evaluated with a computer. Therefore, more design plans can be evaluated than those evaluated by prototyping, a design more suitable for customer's request can be selected. Furthermore, since a prototype costs can be reduced regarding portions other than that can be evaluated only by the prototype, reduction in development cost can be expected. In addition, since a time for the evaluation by the simulator is generally shorter than that of the prototype, reduction in the development period can be expected.

The vehicle simulator is normally realized by using a control system CAD such as Simulink (registered trademark). The control system CAD constructs a whole system by combining blocks. The block indicates a group of models for calculating an output from an input and an internal state. Although the size of the block (referred to as "granularity" below) can be freely set, a single component included in the vehicle is generally referred to as a single block. If the block is created for each component in advance, when a component is actually exchanged, the vehicle integration simulator can cope with the exchange by only exchanging the corresponding block. Therefore, man-hours required for a change are reduced. In addition, by creating the block for each component, component manufacturers can create a plurality of blocks in parallel. Therefore, there is an advantage that a model developing period can be shortened.

CITATION LIST

Non-Patent Literature

NPL 1: Morimoto, Sanada, Principle and Design Method of Energy-Saving Motor, Kagakujyoho shuppan Co., Ltd. (2013.7)

NPL 2: Kanematsu and other 8 members, Radial Force Control of IPMSM Considering Magnetic Flux Distribution on No-Load Condition, The Papers of Technical Meeting on Vehicle Technology VT-12, Institute of Electrical Engineers of Japan (2012.3)

NPL 3: Fukue, Simple Thermal Design Method of Fan Cooled Electronic Equipment with High Accuracy, TED Newsletter No. 72 (2014.4)

SUMMARY OF INVENTION

Technical Problem

The vehicle integration simulator has been used for fuel economy evaluation and driving performance evaluation until now. However, in response to a demand for further shortening the development period in recent years, there has been a demand for using the vehicle integration simulator for evaluation of heat, vibration, and the like. It is expected that the heat, the vibration, and the like during traveling are calculated by simulation and the results are used to improve the structure.

Generally, the heat and the vibration are modeled as a matrix referred to as a rigidity matrix. The rigidity matrix represents a relationship between physical quantities representing the heat and the vibration. Since the rigidity matrix is determined according to a shape of a rigid body, each group of rigid bodies is modeled.

Some electric vehicles have a structure in which a motor is directly fastened to a gearbox. In this case, in the evaluation of the heat and the vibration, the motor and the gearbox form a single block. In a traditional vehicle integration model, the motor and the gearbox respectively form different blocks. However, in consideration of the heat and the vibration, a model granularity is different from that in the traditional model. It is not impossible to model the motor and gearbox as different blocks regarding the heat and the vibration as in the traditional model. However, in this case, a new mutual influence calculation block is required which is formed by modeling a mutual influence between the motor and the gearbox. Generally, a manufacturer for supplying the motors and a manufacturer for supplying the gearboxes are different from each other. However, information straddling both the motor and gearbox is required for the mutual influence calculation block. Therefore, it is not specified which manufacturer makes the mutual influence calculation block.

Solution to Problem

To solve the above problem, a simulation program according to the present invention includes a first model for calculating a first vehicle characteristics parameter, a second model for calculating a second vehicle characteristics parameter to transfer energy without converting the energy, and an interface model for performing conversion calculation of the first vehicle characteristics parameter and the second vehicle characteristics parameter.

Advantageous Effects of Invention

According to the present invention, a portion for calculating a function and a portion depending on a shape in simulation calculation can be separated. Generally, the function and the shape do not correspond to each other one to one, and it is difficult to divide models. According to the present invention, the modeling can be achieved with no inconsistency between the function and the shape.

DESCRIPTION OF EMBODIMENTS

A vehicle integration simulator according to the present invention is suitable for evaluating physical quantities, such as heat loss and vibration (including noise and sound) in particular, which are not main actions for a vehicle. As an application example, usages are assumed for simulating an actual traveling condition by the vehicle integration simulator, obtaining a behavior at that time by simulation and reflecting the behavior to design specification of each component, and extracting uncompleted specification before prototyping.

According to the present invention, a simulation program includes a first model for calculating a first vehicle characteristics parameter, a second model for calculating a second vehicle characteristics parameter to transfer energy without converting the energy, and an interface model for performing conversion calculation of the first vehicle characteristics parameter and the second vehicle characteristics parameter so that a portion for calculating a function and a portion depending on a shape in simulation calculation can be separated. Generally, the function and the shape do not correspond to each other one to one, and it is difficult to divide models. According to the above form, the modeling can be achieved with no inconsistency between the function and the shape.

In the present invention, the first vehicle characteristics parameter includes a current, a voltage, a torque, and a rotation speed which are physical quantities related to vehicle driving force, and the second vehicle characteristics parameter includes a heat flow, a temperature, excitation force, and a displacement speed which are physical quantities related to a loss. Therefore, driving force which is a required function for a vehicle and a loss which is not a required function can be separated from each other. Thus, flexible response such as reduction in time required for calculation can be made by using a simple model for the first model in a case where it is desired to evaluate only the loss and using a simple model for the second model in a case where it is desired to evaluate only the driving force.

In addition, in the present invention, the first model is divided for each component element for calculating energy, and the second model is divided for each mechanical connection. Therefore, the models can be subdivided into each single model, and a whole simulator can be realized by combinations of the divided models. By dividing the models in this way, independence of the model is enhanced. Therefore, it is possible to cope with a model change by exchanging the models, and this is effective for reducing development man-hours.

Furthermore, in the present invention, the simulation program includes a vibration model and a heat model classified into the second model, the vehicle integration simulator can evaluate the heat and the vibration.

Furthermore, in the present invention, the interface includes an excitation force/displacement speed calculation means which constructs an output to the vibration model for simulating vibration from output information of the first model and a vibration energy calculation means which calculates vibration energy from a vibration state. The present invention has advantages such that a whole storage relationship between energy used for driving, the vibration energy, and thermal energy can be considered by obtaining a heat flow by subtracting the vibration energy from loss information obtained from the first model, and analysis accuracy can be improved.

In addition, in the present invention, the simulation program includes an inverter plant model for simulating a behavior of an inverter and a motor plant model for simulating a behavior of a motor as the first mode. By inputting any piece of information of the number of poles of motor, the number of slots, a skew state, a winding method included in the motor plant model as setting values and a modulation system and a modulation rate included in the inverter plant model as setting values, the interface model can cope with a change by setting the parameter of the first model again without changing the second model in a case where the shape of the system using the motor does not largely change. Therefore, it is possible to reduce development man-hours according to the change.

Furthermore, according to the present invention, since the interface model to be connected to a plant model of a gearbox includes any one of a spring, a mass, a viscous resistance, and a backlash, a mechanical library included in a control system CAD can be easily applied, and the development man-hours can be reduced.

Furthermore, in the present invention, the first model includes the interface model so that it is easier to deal with a case of a vehicle in which the components are mounted on a vehicle body. This means that models of the driving, the heat, and the vibration are collected for each component delivered by a component manufacturer. There is an effect to clarify a manufacturer which is responsible for correction/change of the model.

Furthermore, in the present invention, the second model includes the interface model so that it is easier to deal with a case where an automobile manufacturer makes heat and vibration designs of a while vehicle. This means that the models are collected for each structure. Regarding the heat and the vibration, this is effective when a manufacturer which collectively makes a structure (automobile manufacturer) makes a design to minimize adverse effects of the heat and the vibration.

Examples will be described below with reference to the drawings.

Figure 1:
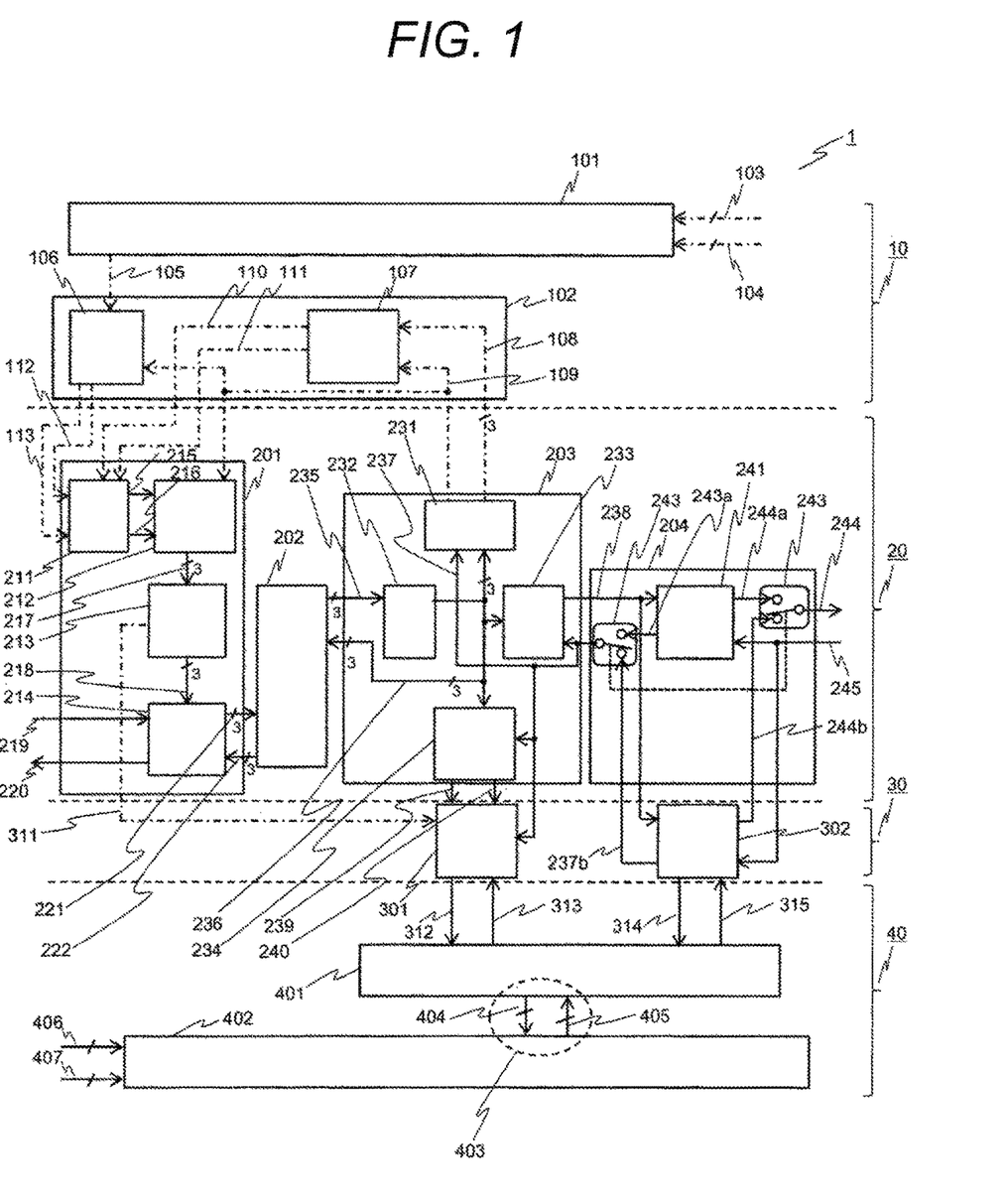
FIG. 1 is a diagram illustrating an example of a vehicle integration simulator focusing on vibration according to the present embodiment.

FIG. 1 is a configuration diagram of a vehicle integration simulator implemented by a simulation program according to the present embodiment. Since the vehicle integration simulator 1 has great number of components and is complex, only a part of the vehicle integration simulator 1 is extracted and illustrated for simple description. In FIG. 1, a motor, an inverter, and a gearbox part of the vehicle integration simulator in an electric vehicle, in particular, parts related to vibration are illustrated.

Models included in the vehicle integration simulator 1 are roughly classified into a control model for simulating a controller, a plant model for simulating a behavior of a component, an energy transfer model focusing on transfer of energy such as heat and vibration, and an interface model for exchanging physical quantities between the plant model and the energy transfer model.

For easy understanding of a designer, the same kind of models is collectively arranged. A place where the model is placed is referred to as a "layer".

The vehicle integration simulator 1 includes a control model layer 10 in which the control models are arranged, a plant model layer 20 in which the plant models are arranged, an interface model layer 30 in which the interfaces are arranged, and an energy transfer model layer 40 in which the energy transfer models are arranged.

The models arranged in the plant model layer 20, the interface model layer 30, and the energy transfer model layer 40 exchange physical quantities mainly used for energy calculation such as a current, a voltage, a torque, and a rotation speed. Solid line arrows in FIG. 1 indicate the physical quantities used for the energy calculation. Alternate long and short dash line arrows indicate control signals. In a case where a plurality of arrows is grouped, a diagonal line is written on the arrow.

The control model layer 10 includes an integration control model 101 and an inverter control model 102. The integration control model 101 receives road information 103 and a driver's operation 104 and outputs a torque command signal 105 to the inverter control model 102.

The inverter control model 102 includes a current vector control block 106 and a three-phase AC/d-q coordinate conversion block 107. The three-phase AC/d-q coordinate conversion block 107 receives a three-phase current detection value 108 and a motor speed detection value 109 from a motor plant model 203 to be described later and outputs a d-axis current estimation value 110 and a q-axis current estimation value 111. The current vector control block 106 outputs a d-axis current command value 112 and a q-axis current command value 113 used for vector control from the torque command signal 105 and the speed detection value 109.

The plant model layer 20 includes an inverter plant model 201, a harness plant model 202, the motor plant model 203, and a gearbox plant model 204.

The inverter plant model 201 includes a current control block 211, a d-q/three-phase AC coordinate conversion block 212, a modulation block 213, and a PWM inverter circuit block 214. The current control block 211 creates a d-axis voltage command 215 and a q-axis voltage command 216 from the d-axis current command 112 and the q-axis current command 113 from the current vector control block 106.

The d-q/three-phase AC coordinate conversion block 212 creates a three-phase voltage command signal 217 from the d-axis voltage command 215 and the q-axis voltage command 216. The three-phase voltage command signal 217 is converted into a three-phase voltage signal 218 by the modulation block 213 and is transmitted to the PWM inverter circuit block 214. The PWM inverter circuit block 214 calculates a direct current 220 and a three-phase voltage 221 by using a direct voltage 219, an alternating current 222 obtained from the harness plant model 202, and the three-phase voltage signal 218.

The harness model 202 receives the three-phase voltage 221 and a motor phase current 236 obtained from the motor plant model 203 and calculates the three-phase current 222 and a motor phase voltage 235.

The motor plant model 203 includes a sensor response characteristics block 231, a motor electric circuit block 232, a torque/loss calculation block 233, and a motor three-phase AC/d-q coordinate conversion block 234. The motor electric circuit block 232 calculates the motor phase current 236 from the motor phase voltage 235 by using a motor equivalent circuit. The torque/loss calculation block 233 calculates a motor torque 238 from the motor phase current 236 and a motor speed 237 obtained from the gearbox plant model 204. The motor three-phase AC/d-q coordinate conversion block 234 calculates a motor d-axis current 239 and a motor q-axis current 240 by using the motor phase current 236 and the motor speed 237. The motor phase current 236 and the motor speed 237 are transmitted to the sensor response characteristics block 231 to calculate the three-phase current detection value 108 and the motor speed detection value 109.

The gearbox plant model 204 includes an equal power conversion/loss calculation block 241 therein. The equal power conversion/loss calculation block 241 receives the motor torque 238 and an axle rotation speed 245 and outputs an axle torque 244*a* and a motor rotation speed 243*a*. The equal power conversion/loss calculation block 241 uses a gear efficiency (η) and a gear ratio (ρ) as setting parameters. When it is assumed that the motor torque 238 be τ, the axle torque 244*a* be is, the axle rotation speed 245 be ωs, and the motor rotation speed 243*a* be ω, the following simple relational expression is satisfied.

$$\tau s = \rho \eta \tau$$

$$\omega s = \omega / \rho$$

In the present example, the gearbox plant model 204 includes a switch 243 and selects the equal power conversion/loss calculation block 241 or a gearbox/vibration interface 302 to be described later. This is for acceleration of calculation by using a simple equal power conversion/loss calculation block 241 in a case where it is not necessary to calculate the vibration. Vibration excitation force is calculated by the gearbox/vibration interface model 302 to be described later.

A detailed control method of the inverter and the motor as described above is disclosed in, for example, NPL 1. Therefore, the description is omitted.

The interface model layer 30 includes a motor/vibration interface 301 and the gearbox/vibration interface 302. Considering electromagnetic vibrations of the inverter, the inverter/vibration interface 301 can be provided. However, in the present example, inverter vibration is sufficiently smaller than motor vibration in a relatively low frequency domain in which vehicle vibration causes a problem. Therefore, the inverter vibration is omitted.

The motor/vibration interface 301 calculates motor excitation force 312 by using the motor speed 237, the motor d-axis current 239, the motor q-axis current 240 obtained from the motor plant model 203, a modulation system and a modulation degree 311 obtained from the modulation block 213 in the inverter plant model 201, and a motor displacement speed 313 obtained from a transaxle vibration model 401 to be described later. A specific calculation method of the motor excitation force 312 is disclosed in NPL 2, for example. By previously mapping or approximating the motor excitation force at each operation point of the motor calculated based on the above method, the motor/vibration interface 301 can be realized.

In general, since the motor excitation force depends on a relation between a mechanical angle rotation number and an electrical angle rotation number of the motor, the motor excitation force can be set from outside as setting the number of poles of the motor as a setting parameter. Furthermore, since an induced voltage waveform per electrical angle rotation and the modulation system and a modulation rate of the inverter relate to the motor excitation force, the number of slots and a winding method are set as setting parameters. In a case where the motor has a skew, it is also effective to set a skew state such as a skew angle as the setting parameter.

When the shape significantly changes, it is necessary to reconstruct the transaxle vibration model 401. However, within a normal design change range, excitation force can be often calculated only by correcting the setting parameters. If the corrected parameters can be set by the inverter plant model 201 and the motor plant model 203, it is possible to flexibly cope with the change of the model.

The gearbox/vibration interface 302 receives the motor torque 238 and the axle rotation speed 245 obtained from the gearbox plant model 204 and a gearbox displacement speed 315 obtained from the transaxle vibration model 401 to be described later and calculates a motor rotation speed 237b and an axle torque 244b. The gearbox/vibration interface 302 is modeled as a spring-mass-damper-backlash system of a general mechanical system. A specific model will be described later.

The energy transfer model layer 40 includes the transaxle vibration model 401 and a vehicle body vibration model 402. The transaxle vibration model 401 is expressed by a rigidity matrix of a structure to which the motor and the gearbox are fastened. The transaxle vibration model 401 and the vehicle body vibration model 402 are coupled by a mount 403. The mount 403 transfers excitation force 404 and a displacement speed 405 of each mount. Furthermore, physical quantities input to the vehicle body vibration model 402 are forced external force 406 and a forced displacement speed 407.

In the present embodiment, the block arranged in the energy transfer model layer 40 only transfers energy and performs calculation by delegating the function to the model in the plant model layer 20 via the interface in a case where conversion of energy is needed. Therefore, the motor excitation force 312, the gear excitation force 314, the excitation force 404 of the mount 403, and the forced external force 406 are all the same physical quantity and have the same force dimension. In addition, the motor displacement speed 313, the gear displacement speed 315, the displacement speed 405 of the mount 403, and the forced displacement speed 407 are the same physical quantities and have the same dimension of speed. Since energy (work rate) per unit time is obtained by multiplying power by a speed, it can be said that the energy transfer model layer 40 is a region where the energy is transferred.

By dividing the energy transfer model layer 40 in this way, only a portion depending on the shape can be independently used. That is, in a case where the characteristics of the component is changed, it is preferable to change the model in the plant model layer 20, and in a case where the shape and mechanical restriction are changed, it is preferable to change the model in the energy transfer model layer 40. In both cases, an effect on the other models can be reduced. In addition, by providing the interface layer 30, functions for heat analysis and vibration analysis can be easily added to the vehicle integration simulator realized by the traditional plant model layer 20.

Even when it is desired to omit a part of the heat and vibration calculation in consideration of balance with an execution time, the omission can be easily made by deleting the interface model or the energy transfer model corresponding to the portion to be omitted. As described above, according to the present embodiment, the vehicle integration simulator which can easily combine the models according to the usage and easily cope with the change can be realized.

Figure 2:
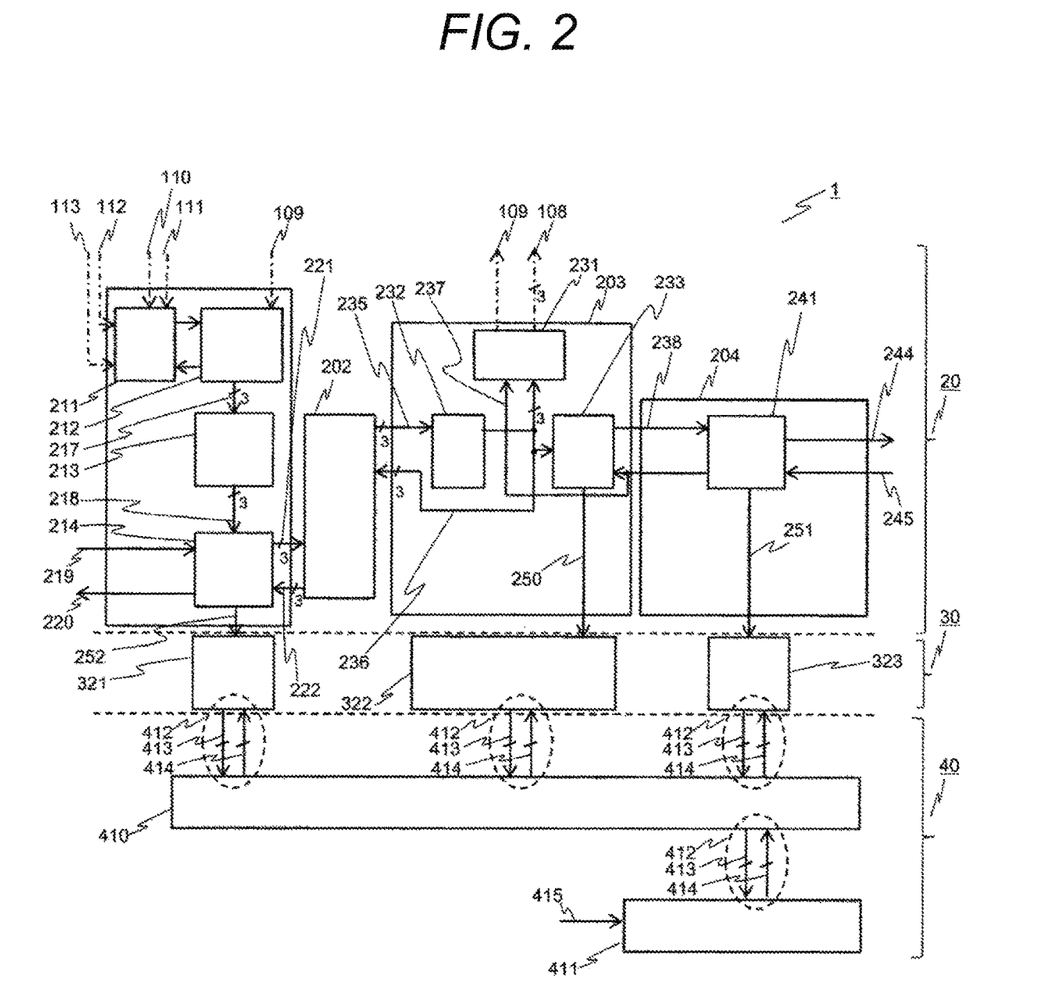
FIG. 2 is a diagram illustrating an example of a vehicle integration simulator focusing on heat according to the present embodiment.

Regarding the heat, similar modeling can be applied. FIG. 2 is a configuration diagram of a vehicle integration simulator focusing on the heat according to the present embodiment. Since the control model layer 10 is the same as that in FIG. 1, the control model layer 10 is omitted.

Although having many common portions, the control model layer 20 is different from that in FIG. 1 in that a motor heat flow 250, a gearbox heat flow 251, and an inverter heat flow 252 are sent to the interface model layer 30. Here, the "heat flow" is thermal energy which moves per unit time and is expressed by heat flux×heat transfer area. In FIG. 2, it is assumed that all the loss changes to heat. At this time, it is assumed that the motor heat flow 250 be equal to the loss calculated by the torque/loss calculation block 233. It is assumed that the gearbox heat flow 251 be equal to the loss calculated by the equal power conversion/loss calculation block 241. It is assumed that the inverter heat flow 252 be equal to an integrated loss value of a PWM inverter circuit. An inverter/heat interface 321 calculates a temperature in the inverter from a temperature and a heat flow of a heat exchanging portion with a cooling device by a radiator. Specifically, a thermal circuit method can be used. Since details of the thermal circuit method is written in NPL 3, the description thereof will be omitted. This is similarly applied to a motor/heat interface 322 and a gearbox/heat interface 323. In FIG. 2, the inverter/heat interface 321, the motor/heat interface 322, and the gearbox/heat interface 323 are arranged in the interface model layer.

A radiator model 410 and an outside air model 411 are arranged in the energy transfer model layer 40. When focusing on the heat, the energy transfer model layer 40 transfers a heat flow 413 and a temperature 414 by a heat exchanging portion 412.

Figure 3:
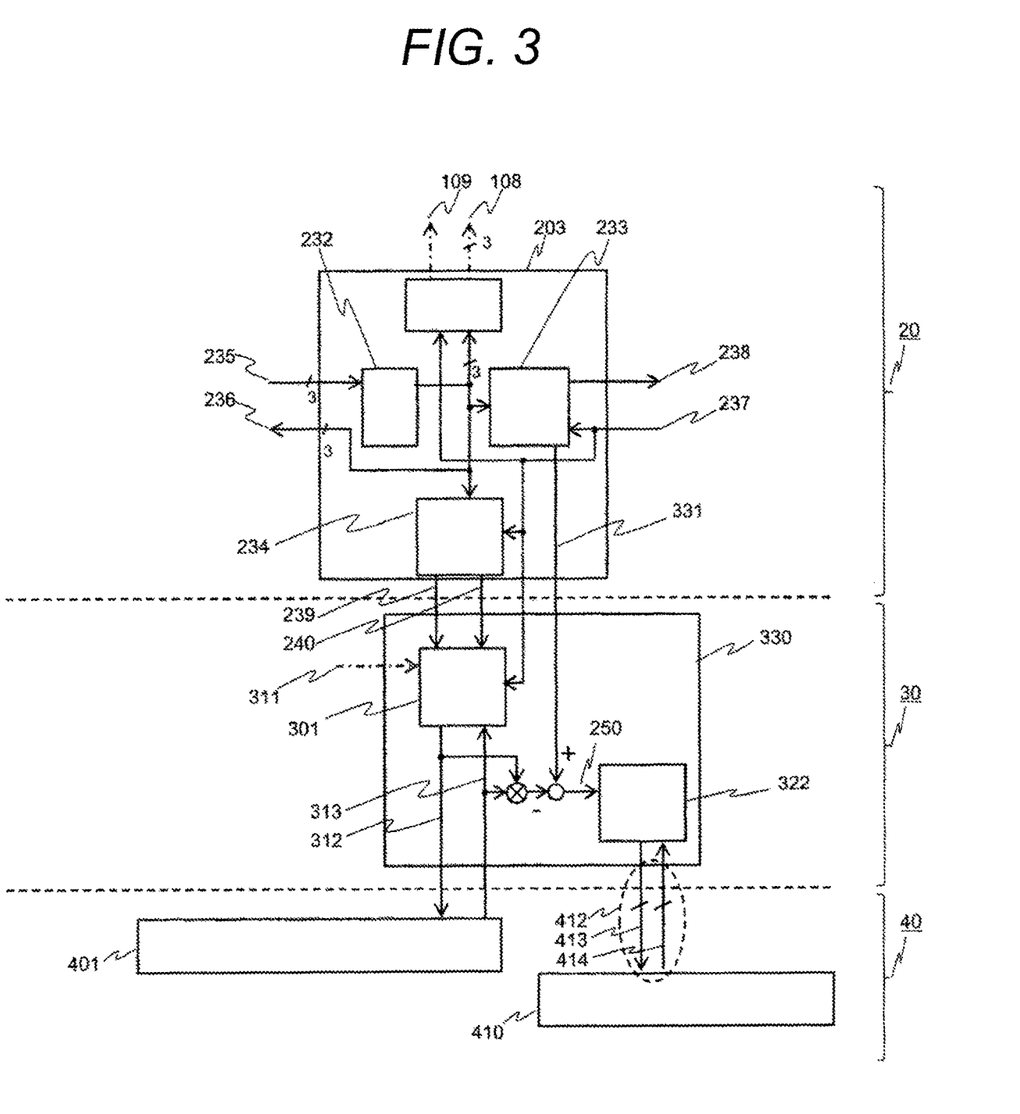
FIG. 3 is a diagram illustrating an example of a motor interface which simultaneously uses the heat and the vibration.

FIG. 3 is a diagram illustrating an example of a motor interface which simultaneously uses the heat and the vibration. For simple illustration, only an interface portion related to the motor and its surroundings are illustrated in FIG. 3.

A motor interface 330 includes both the motor/vibration interface 301 in FIG. 1 and motor/heat interface 322 in FIG. 2. The interface model, the plant model, the energy transfer model, and the control model can be nested.

As described with reference to FIG. 1, the motor/vibration interface 301 calculates the motor excitation force 312 and outputs the calculated motor excitation force 312 to the transaxle vibration model 401. The transaxle vibration model 401 returns the motor displacement speed 313 to the motor/vibration interface 301. Here, a product of the motor excitation force 312 and the motor displacement speed 313 expresses energy (power) per unit time used for vibration. In the following description, the energy and the power are not particularly distinguished.

The energy applied to the motor plant model 203 is divided into energy to be effectively used and loss energy. The loss energy is divided into vibration energy and energy to be heat. Since the vibration energy can be represented by a product of the motor excitation force 312 and the motor displacement speed 313, the energy to be the heat is the motor heat flow 250 in FIG. 2 and can be expressed by subtracting the vibration energy from a total loss 331. The heat flow 413 transmitted to the radiator model 410 is obtained by applying the motor heat flow 250 and the temperature 414 from the radiator model 410 to the heat converting portion 412.

Figure 4:
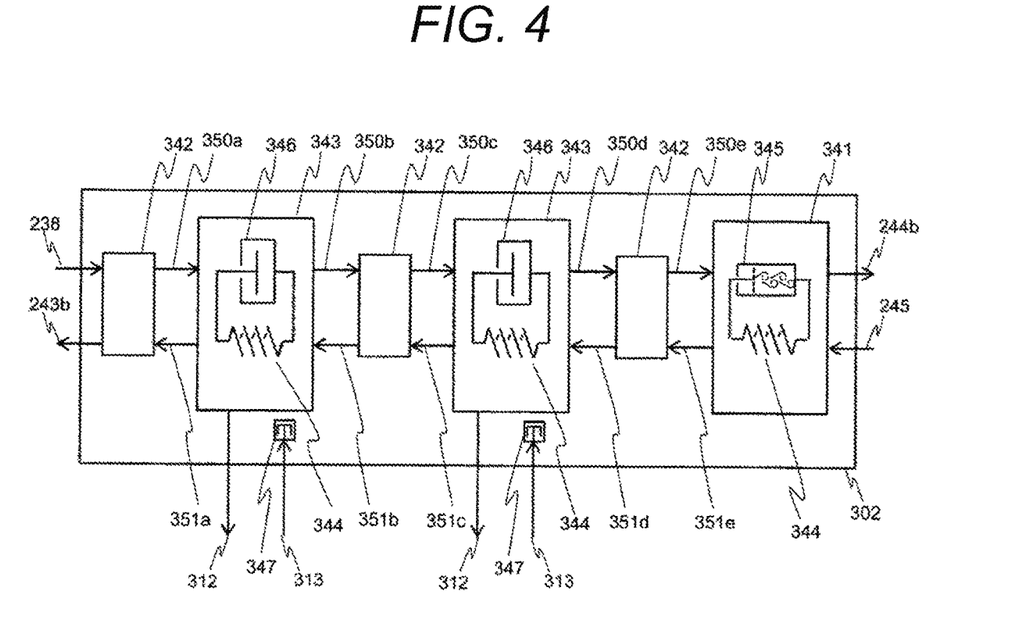
FIG. 4 is a diagram illustrating an example of a gearbox/vibration interface 302.

FIG. 4 is a diagram illustrating an example of the gearbox/vibration interface 302. Here, a case where the gearbox is formed by using two gears is exemplified.

The gearbox/vibration interface 302 is realized by combining a drive shaft block 341, mass blocks 342, and gear blocks 343. Three mass blocks 342 are arranged for two gears and one shaft, and two gear blocks 343 are arranged for two gears included in the interface 302.

The drive shaft block 341 includes a spring 344 for simulating elastic deformation of a shaft and a damper 345 for simulating a viscous resistance of lubricating oil, grease, and the like. The gear block 343 includes the spring 344 for simulating the elastic deformation of the gear and a backlash 346 representing a backlash of the gear. The drive shaft block 341, the mass blocks 342, the gear blocks 343 are associated with each other by local torques 350a to 350e and local rotation speeds 351a to 351e.

Since the vibration of the gearbox largely depends on a torque fluctuation of the gear block 343, the motor excitation force 312 is extracted from the torque fluctuation acting on the gear block 343. Since the gearbox is integrated as a transaxle, the transaxle vibration model 401 collectively evaluates the vibration of the gearbox as a single gearbox. Therefore, the gearbox/vibration interface 302 and the gearbox plant model 204 do not use the displacement speed obtained from the transaxle vibration model 401. Therefore, in FIG. 4, subsequent evaluation of the motor displacement speed 313 is stopped by a terminator 347.

In some control system CAD, a component for simulating a behavior of e mechanical system is prepared. Mechanical elements are arranged/connected as illustrated in FIG. 4 so that the gearbox/vibration interface 302 can be easily realized.

By assuming that the viscous resistance is small, the damper 345 can be omitted. Furthermore, in a case where a friction transfer mechanism is used as in a CVT, the backlash 346 can be omitted.

Figure 5:
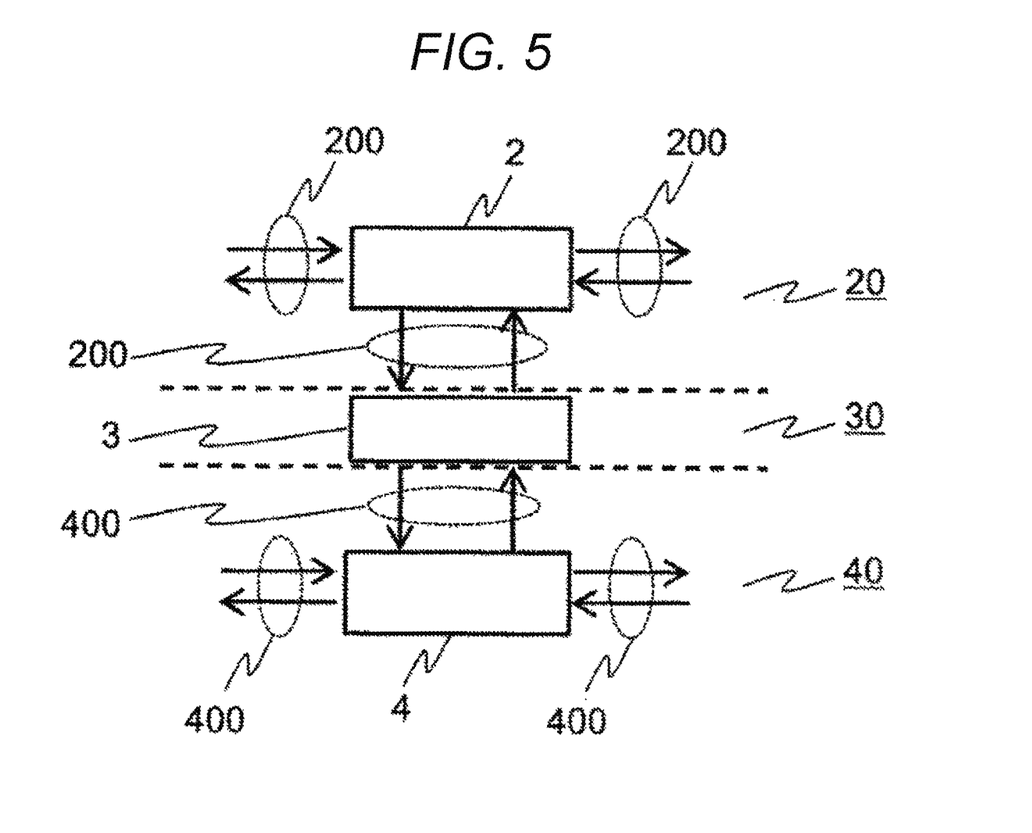
FIG. 5 is a diagram illustrating a basic configuration of a simulation program according to the present embodiment.

In FIG. 5, a basic configuration of a simulation program according to the present embodiment is illustrated. The simulation program includes a first model 2 which performs conversion of energy forms, amplification, loss calculation, and the like relative to a general physical quantity 200 such as a voltage, a current, a torque, and a rotation speed and a second model 4 which simulates transfer of the energy without converting the energy by calculation. In the second model 4, transfer energy 400 such as a heat flow, a temperature, excitation force, and a displacement speed is transferred.

The first model 2 and the second model 4 are associated with each other by the interface 3, and the interface 3 performs conversion calculation between the general physical quantity 200 and the transfer energy 400.

In the model illustrated in FIG. 5, the interface 3 is independent. However, the interface 3 can be included in the first model 2 or the second model 4.

Figure 6:
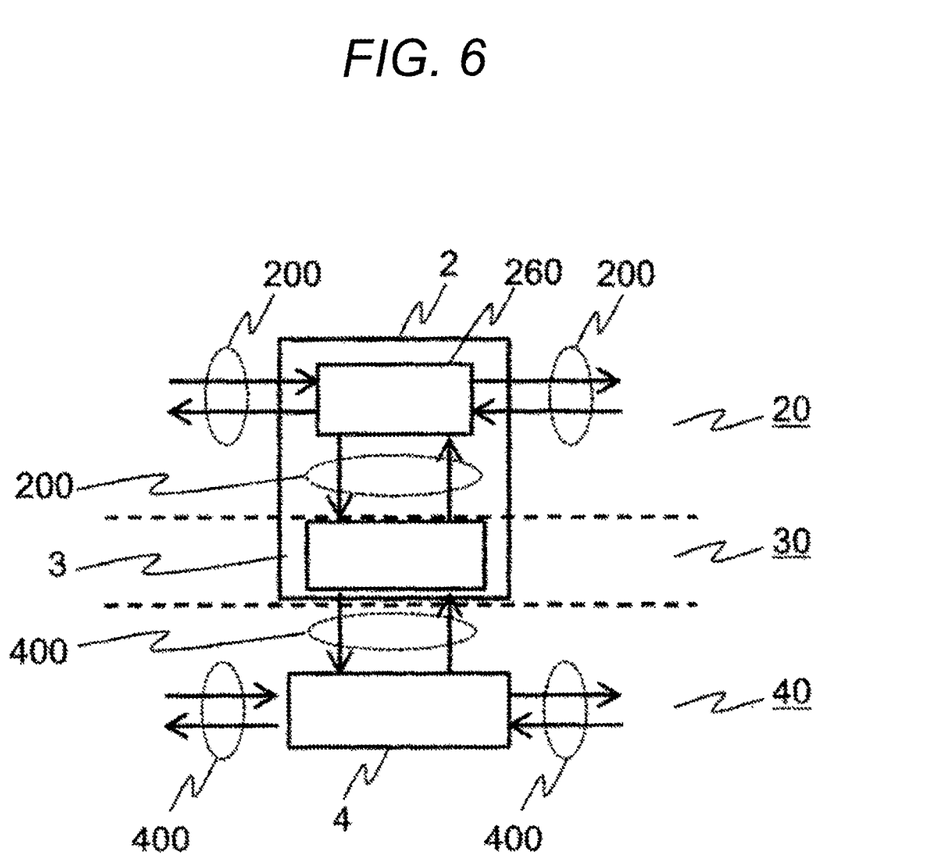
FIG. 6 is a diagram illustrating an example in which an interface is included in a first model.

FIG. 6 is a diagram illustrating an example in which the interface 3 is included in the first model 2. Here, an internal operation block 260 actually performs the conversion of the energy forms, the amplification, and the loss calculation relative to the general physical quantity 200.

Figure 7:
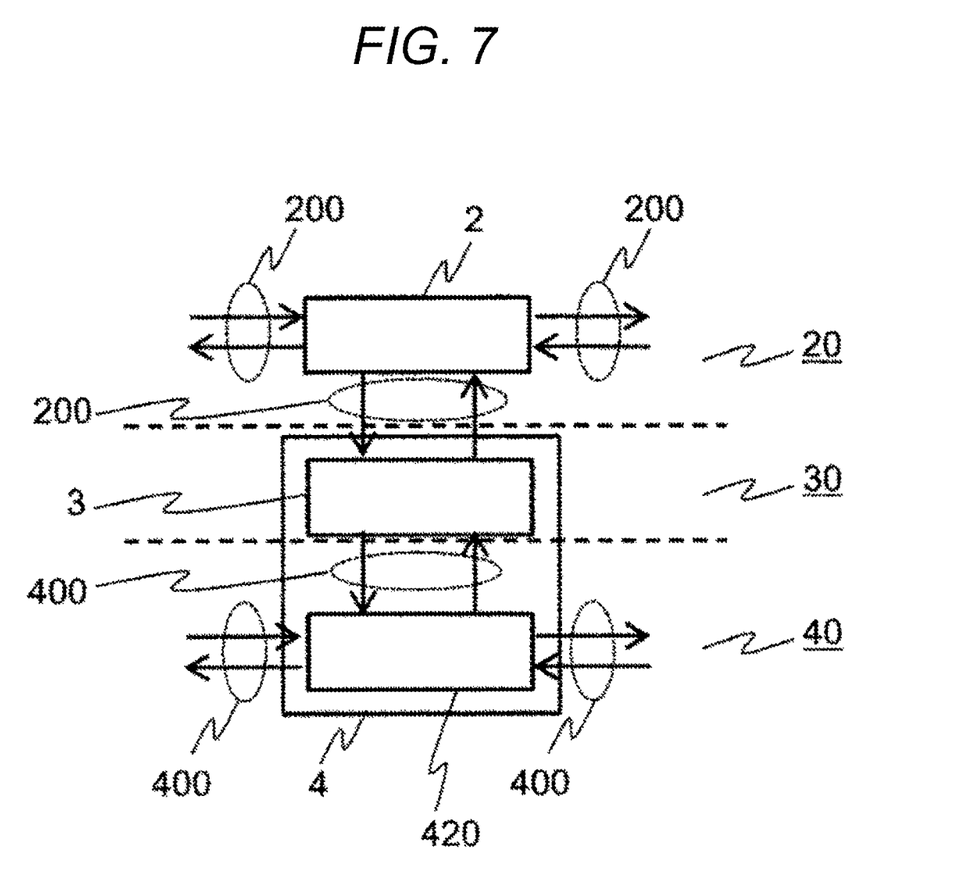
FIG. 7 is a diagram illustrating an example in which an interface is included in a second model.

FIG. 7 is a diagram illustrating an example in which the interface 3 is included in the second model 4. Here, a transfer operation block 420 simulates energy transfer by calculation.

The configurations illustrated in FIGS. 5, 6, and 7 are determined by territories of an agent for integrally controlling a system and an agent for supplying components. The agent for integrally controlling the system is referred to as "A", and the agents for supplying components are referred to as "B" and "C". The configuration in FIG. 5 is used, for example, in a case where B delivers electrical components, C delivers structures, and A combines the delivered parts. B creates the first model 2, C creates the second model 4, and A creates the interface 3. B and C can create models based on only information on the territories of B and C The information which straddles both the first model 2 and the second model 4 is required for creating the interface 3. Therefore, the interface 3 is created by A which can access the information of both models.

The configuration illustrated in FIG. 6 is used, for example, in a case where B delivers a mechanically/electrically-integrated component to A. In this case, B creates the first model 2, and A creates the second model 4. The configuration in FIG. 7 is used, for example, in a case of an electric vehicle in which A designs a casing of a motor to minimize the vibration, and B delivers a rotor portion of the motor. This causes an effect such that the scope of responsibility is clarified and processes for referring to information from other model v at the time of creating/correcting the model is reduced due to high independence of models.

REFERENCE SIGNS LIST 1 vehicle integration simulator
2 first model
3 interface
4 second model
10 control model layer
20 plant model layer
30 interface model layer
40 energy transfer model layer
101 integration control model
102 inverter control model
103 road information
104 driver's operation
105 torque command signal
106 current vector control block
107 three-phase AC/d-q coordinate conversion block
108 three-phase current detection value
109 motor speed detection value
110 d-axis current estimation value
111 q-axis current estimation value
112 d-axis current command value
113 q-axis current command value
200 general physical quantity
201 inverter plant model
202 harness plant model
203 motor plant model
204 gearbox plant model
211 current control block
212 d-q/three-phase AC coordinate conversion block
213 modulation block
214 PWM inverter circuit block
215 d-axis voltage command
216 q-axis voltage command
217 three-phase voltage command signal
218 three-phase voltage signal 219 direct voltage
220 direct current
221 three-phase voltage
222 alternating current
231 sensor response characteristics block
232 motor electric circuit block
233 torque/loss calculation block
234 motor three-phase AC/d-q coordinate conversion block
235 motor phase voltage
236 motor phase current
237 motor speed
237b motor rotation speed
238 motor torque
239 motor d-axis current
240 motor q-axis current
241 equal power conversion/loss calculation block
243 switch
243a motor rotation speed
244a axle torque
244b axle torque
245 axle rotation speed
250 motor heat flow
251 gearbox heat flow
252 inverter heat flow
260 internal operation block
301 motor/vibration interface
302 gearbox/vibration interface model
311 modulation system and modulation degree
312 motor excitation force
313 motor displacement speed
315 gearbox displacement speed
321 inverter/heat interface
322 motor/heat interface
323 gearbox/heat interface
330 motor interface
331 total loss
341 drive shaft block
342 mass block
343 gear block
344 spring
345 damper
346 backlash
347 terminator
350a to 350e local torque
351a to 351e local rotation speed
400 transfer energy
401 transaxle vibration model
402 vehicle body vibration model
403 mount
404 excitation force
405 displacement speed
406 forced external force
407 forced displacement speed
410 radiator model
411 outside air model
412 heat exchanging portion
413 heat flow
414 temperature
420 transfer operation block

The invention claimed is:

1. A non-transitory computer readable storage medium storing instructions, which when executed causes a processor to:
simulate a first model to calculate a first vehicle characteristics parameter;
simulate a second model to calculate a second vehicle characteristics parameter to transfer energy without converting the energy; and
simulate an interface model to perform conversion calculation of the first vehicle characteristics parameter and the second vehicle characteristics parameter, wherein
the first vehicle characteristics parameter includes a current, a voltage, a torque, and a rotation speed which are physical quantities related to vehicle driving force,
the second vehicle characteristics parameter includes a heat flow, a temperature, excitation force, and a displacement speed which are physical quantities related to a loss,
a vibration model and a heat model classified into the second model are included,
the interface model includes an excitation force/displacement speed calculation unit which constructs an output to the vibration model for simulating vibration from output information of the first model and a vibration energy calculation unit which calculates vibration energy from a vibration state, and
a heat flow is obtained by subtracting the vibration energy from loss information in the first vehicle characteristics parameter obtained from the first model.

2. The non-transitory computer readable storage medium according to claim 1, wherein
the first model is divided for each component element for calculating energy, and
the second model is divided for each mechanical connection.

3. The non-transitory computer readable storage medium according to claim 2, wherein
the first model is included as an inverter plant model which simulates a behavior of an inverter and a motor plant model which simulates a behavior of a motor, and
the interface model inputs any piece of information including the number of poles of a motor, the number of slots, a skew state, a winding method included in the motor plant model as setting values and a modulation system and a modulation rate included in the inverter plant model as setting values.

4. The non-transitory computer readable storage medium according to claim 2, wherein
the interface model to be connected to a plant model of a gearbox includes any one of a spring, a mass, a viscous resistance, and a backlash.

5. The non-transitory computer readable storage medium according to claim 1, wherein
the first model includes the interface model.

6. The non-transitory computer readable storage medium according to claim 1, wherein
the second model includes the interface model.

* * * * *